US012656580B2

(12) United States Patent
Xiong et al.

(10) Patent No.: US 12,656,580 B2
(45) Date of Patent: Jun. 16, 2026

(54) MICRO-LIGHT NIGHT VISION LENS

(71) Applicants: WUHAN GOLDEN MINNA PHOTOELECTRIC SCI & TECH CO., LTD, Wuhan (CN); WUHAN Quanjiada PHOTOELECTRIC SCI & TECH CO., LTD, Wuhan (CN)

(72) Inventors: Haibei Xiong, Wuhan (CN); Min Xiong, Wuhan (CN); Xiaoming Peng, Wuhan (CN); Xing Zhao, Wuhan (CN); Yong Xie, Wuhan (CN); Fan Hu, Wuhan (CN); Shaoyong Li, Wuhan (CN); Rong Song, Wuhan (CN)

(73) Assignees: WUHAN GOLDEN MINNA PHOTOELECTRIC SCI & TECH CO., LTD, Wuhan (CN); WUHAN Quanjiada PHOTOELECTRIC SCI & TECH CO., LTD, Wuhan (CN)

( * ) Notice: Subject to any disclaimer, the term of this patent is extended or adjusted under 35 U.S.C. 154(b) by 329 days.

(21) Appl. No.: 18/410,987

(22) Filed: Jan. 11, 2024

(65) Prior Publication Data

US 2025/0060562 A1     Feb. 20, 2025

(30) Foreign Application Priority Data

Aug. 14, 2023    (CN) .......................... 202311016771.5

(51) Int. Cl.
G02B 13/00      (2006.01)
G02B 13/16      (2006.01)

(52) U.S. Cl.
CPC ......... G02B 13/0045 (2013.01); G02B 13/16 (2013.01)

(58) Field of Classification Search
CPC ............................ G02B 13/0045; G02B 13/16
See application file for complete search history.

(56) References Cited

PUBLICATIONS

CN-111308664-A (Year: 2021).*

* cited by examiner

*Primary Examiner* — Nathanael R Briggs

(57) ABSTRACT

The present invention provides a micro-light night vision lens comprising a hollow cylinder body; a number of transition segments, communicated with each other provided in turn on an inner surface of the cylinder body along its axial extension direction; a plurality of lens units, provided in succession and at intervals at different positions on the inner surface of the cylinder body along the central axis direction thereof; a CCD unit, provided at one end of the cylinder body in the axial direction and located on the light-out side of the lens unit therein, and spaced apart from the cylinder body, the radial dimension of the CCD unit does not exceed the diameter of the lens unit at the other end of the cylinder body in the axial direction. By reasonably laying out the lens unit, the present invention obtains a larger effective focal length and imaging quality.

3 Claims, 5 Drawing Sheets

2: FFT MTF Frequency=7.518,MTF=0.5233
Update Set Print Window Text Zoom in

3: Spot Diagram
Update Set Print Window Text Zoom in

MICRO-LIGHT NIGHT VISION LENS

TECHNICAL FIELD

The present invention relates to a technical field of micro-light night vision, and in particular to a micro-light night vision lens.

BRIEF DESCRIPTION OF THE RELATED ART

A micro-light night vision device is a kind of electronic apparatus that collects weak light signals from the environment and performs image enhancement processing so that the human eye can recognize the contour of the object, providing the ability to observe and recognize the target under poor lighting conditions, and the micro-light night vision device is in a passive mode of operation, with better concealment.

The key part of the micro-light night vision device is the lens part, and the micro-light night vision lens collects light entering the device, and converts it into electrical signals, and further performs subsequent signal enhancement and visualization. In order to meet the demand for miniaturization and high transmittance, the Chinese invention patent with the Publication No. CN111308664A discloses a kind of micro-light night vision device, the outer diameter of the lens in the main lens cylinder body decreases sequentially to adapt to the smaller CCD size; however, with the continuous improvement of customer demand, there are higher requirements under the smaller overall size of the lens, on the aspects like adapting to the larger size of the CCD, improving the quality of the imaging, enriching the details of the image. The existing products are difficult to meet the above needs.

In order to solve the above problems, it is very necessary to design and develop a compact structure, adaptable to larger size CCD miniaturized, micro-light night vision lens.

SUMMARY OF THE DISCLOSURE

In view of the above, the present invention proposes out a micro-light night vision lens with a compact structure that can be adapted to a larger size CCD.

The technical solution of the present invention is realized as follows: the present invention provides the micro-light night vision lens comprising:

a hollow cylinder body;

a plurality of transition segments, communicated with each other and provided in turn on an inner surface of the cylinder body along its axial extension direction;

a plurality of lens units, provided in succession and at intervals at different positions on the inner surface of the cylinder body along a central axis direction of the cylinder body;

a CCD unit, provided at one end of the cylinder body in the axial direction, wherein the CCD unit is located on a light-out side of the corresponding lens unit and spaced apart from the cylinder body, and the CCD unit having a radial dimension which is not larger than a diameter of the lens unit at the other end of the cylinder body in the axial direction.

On the basis of the above technical solution, preferably the number of the transition segments is four, inner diameters of a first transition segment, a second transition segment, and a third transition segment are decreased in sequence, an inner diameter of a fourth transition segment is larger than an inner diameter of the third transition segment, and is smaller than the inner diameter of the second transition segment.

Preferably, the number of the lens units are six, a first lens unit is disposed at an end of the first transition segment away from the second transition segment; a second lens unit is disposed at an end of the first transition segment adjacent to the second transition segment; a third lens unit is disposed at a non-end position of the second transition segment; a fourth lens unit is provided at an end of the second transition segment adjacent to the third transition segment; a fifth lens unit is provided at a non-end position of the third transition segment; a sixth lens unit is provided on an internal surface of the cylinder body at an end of the third transition segment adjacent to the fourth transition segment; annular position limiting members are separately provided between the first lens unit and the second lens unit, between the second lens unit and the third lens unit, between the third lens unit and the fourth lens unit, and between the fifth lens unit and the sixth lens unit, and are set against each other with edges of end surfaces of the adjacent lens units.

Preferably, the first lens unit includes a first meniscus convex lens, a radius of curvature of a convex surface of a light-in side of the first meniscus convex lens is smaller than a radius of curvature of a concave surface of a light-out side of the first meniscus convex lens, and the convex surface of the light-in side of the first meniscus convex lens also extends outwardly beyond an end surface contour of the cylinder body.

Preferably, the second lens unit includes a first piano-concave lens and a second piano-concave lens, a concave surface of the first piano-concave lens is a light-in side of the second lens unit and a concave surface of the second piano-concave lens is a light-out side of the second lens unit, the concave surface of the first piano-concave lens has a radius of curvature greater than the radius of curvature of the concave surface of the second piano-concave lens, and a flat end surface of the first piano-concave lens and a flat end surface of the second piano-concave lens are set against each other.

Preferably, the third lens unit includes a piano-convex lens, a convex surface of the piano-convex lens is a light-in side of the third lens unit, and a flat end surface of the piano-convex lens is a light-out side of the third lens unit; the diameter of the piano-convex lens is identical to that of the second piano-concave lens, and a radius of curvature of the convex surface of the piano-convex lens is smaller than the radius of curvature of the convex surface of the first meniscus convex lens.

Preferably, the fourth lens unit includes a biconvex lens, a radius of curvature of the convex surface of the light-in side of the biconvex lens is smaller than a radius of curvature of the convex surface of the light-out side of the biconvex lens; and the radius of curvature of the convex surface of the light-in side of the biconvex lens is also larger than the radius of curvature of the convex surface of the light-in side of the first meniscus convex lens;

Preferably, the fifth lens unit includes a second meniscus convex lens and a first meniscus concave lens, wherein a light-in side of the second meniscus convex lens and a light-in side of the first meniscus concave lens are both concave surfaces, a light-out side of the second meniscus convex lens and a light-out side of the first meniscus concave lens are both convex surfaces, and the radius of curvature of the light-out side of the second meniscus convex lens is equal to the radius of curvature of the light-in side of the first meniscus concave lens and they fit each other, and the radius of curvature of the concave surface of the light-in side of the second meniscus convex lens is smaller than the radius of curvature of the convex surface of the light-out side of the first meniscus concave lens;

Preferably, the sixth lens unit includes a second meniscus concave lens, wherein the light-in side of the second meniscus concave lens is a concave surface and the light-out side thereof is a convex surface, the radius of curvature of the light-in side being less than the radius of curvature of the light-out side, and a diameter of the sixth lens unit is larger than the diameters of the second lens unit, the third lens unit, or the fourth lens unit, and not larger than the diameter of the first lens unit or the diameter of the second lens unit.

Preferably, an outer diameter of the cylinder body corresponding to a first transition segment, an outer diameter of the cylinder body corresponding to a second transition segment, and an outer diameter of the cylinder body corresponding to a third transition segment are decreased in sequence, an outer diameter of the cylinder body corresponding to a fourth transition segment is larger than an outer diameter of the cylinder body corresponding to the third transition segment, and is smaller than an outer diameter of the cylinder body corresponding to the second transition segment.

The micro-light night vision lens provided by the present invention has the following beneficial effects with respect to the prior art:

instead of adopting the prior art scheme of decreasing the outer diameter of the lens in sequence, the present invention, by a reasonable structural design, makes the size of the CCD and the diameter of the lens on the light-in side comparable to each other, which can obtain more details of the image and improve the quality of the image imaging under the micro-light environment, when the present invention is applicable to a small volume and a fixed object distance situation, it will obtain a larger effective focal length EFL, so that the range of view and the clarity of the micro-light night vision lens can be improved.

BRIEF DESCRIPTION OF THE DRAWINGS

In order to more clearly illustrate the technical solutions in the embodiments or the prior art of the present invention, the following drawings to be used in the description of the embodiments or the prior art will be briefly introduced below, and it will be obvious that the following drawings in the description are only some of the embodiments of the present invention, and that for the skilled person in the art, other drawings can be obtained on the basis of the following drawings without inventive labor.

Figure 1:
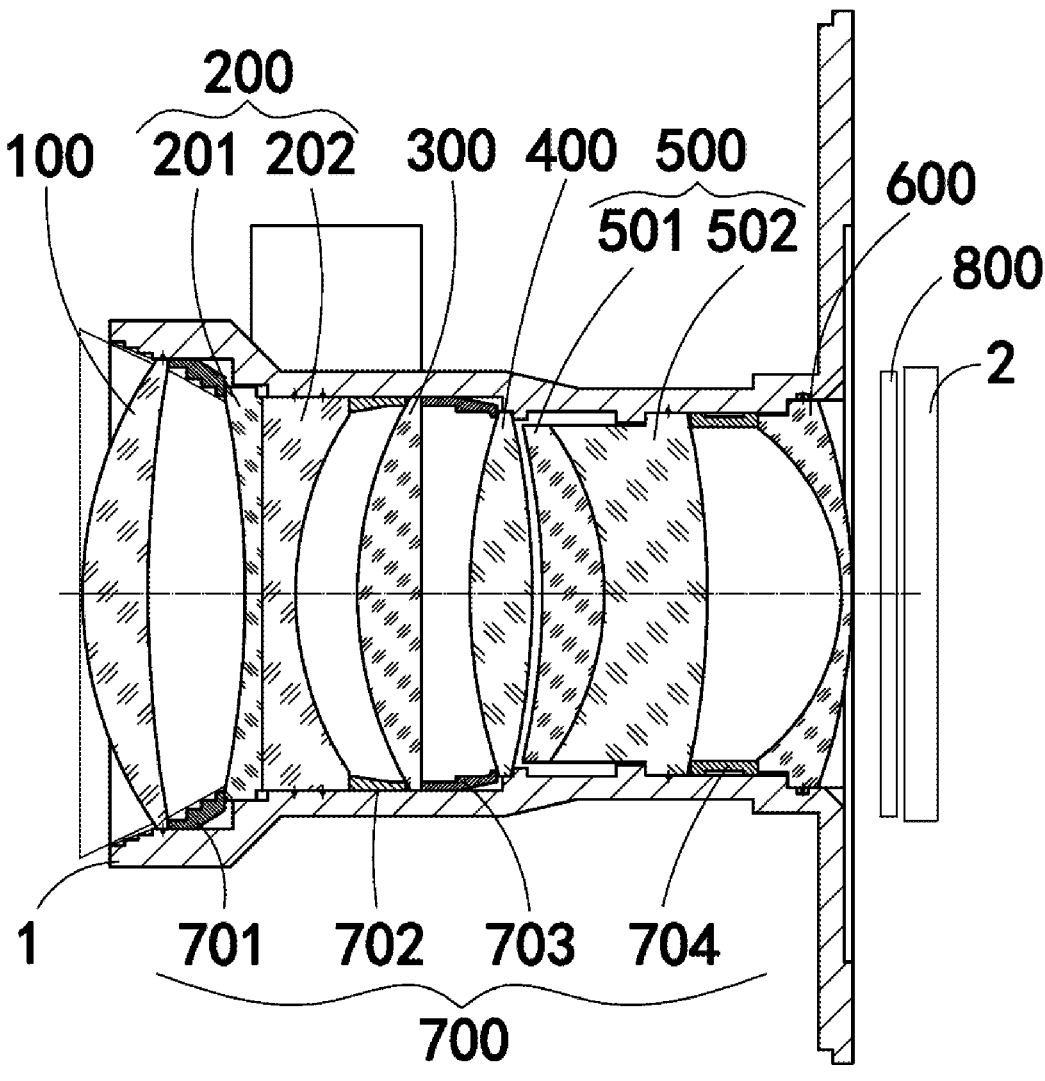
FIG. 1 is a semi-sectional front diagram of an inner structure of the micro-light night vision lens of the present invention.

Reference numerals: 1. cylinder body; 2. CCD unit; 11. first transition segment; 12. second transition segment; 13. third transition segment; 14. fourth transition segment; 100. first lens unit; 200. second lens unit; 300. third lens unit; 400.

fourth lens unit; 500. fifth lens unit; 600. sixth lens unit; 700. annular position limiting members; 800. planar lens; 201. first piano-concave lens; 202. second piano-concave lens; 501. second meniscus convex lens; 502. first meniscus concave lens; A. first stepped portion; B. second stepped portion; C. third stepped portion; D. fourth stepped portion; 701. first annular position limiting member; 702. second annular position limiting member; 703. third annular position limiting member; 704. forth annular position limiting member;

DETAILED DESCRIPTION OF EXEMPLARY EMBODIMENTS

In conjunction with the embodiments of the present invention, the technical solutions in the embodiments of the present invention will be described clearly and completely below. It is obvious that the described embodiments are merely a part of the embodiments of the present invention, rather than all the embodiments. According to the embodiments of the present invention, any other embodiments of the present invention obtained by the ordinally skilled person in the art without inventive labor, are included in the scope of the present invention.

Figure 2:
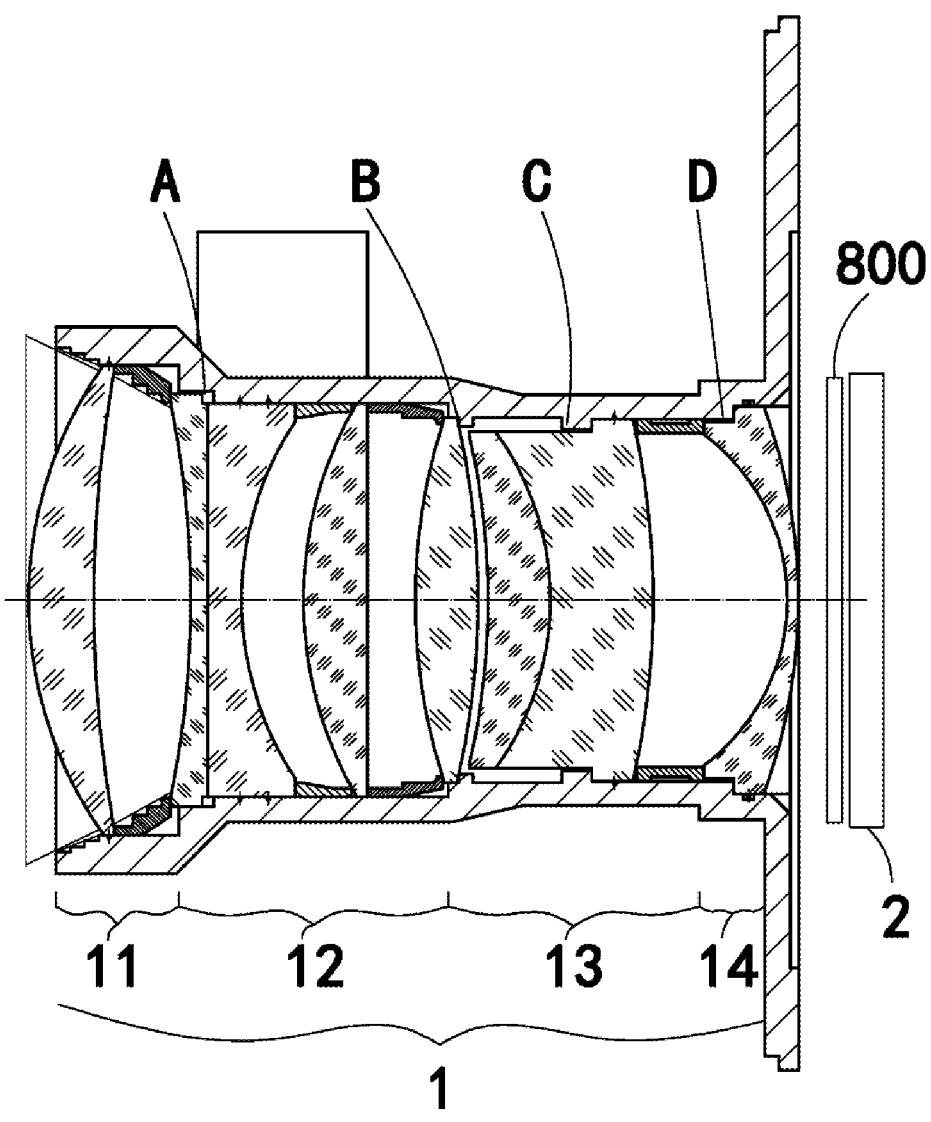
FIG. 2 is a lay-out schematic diagram of a plurality of transition segments of the micro-light night vision lens of the present invention.
Figure 3:
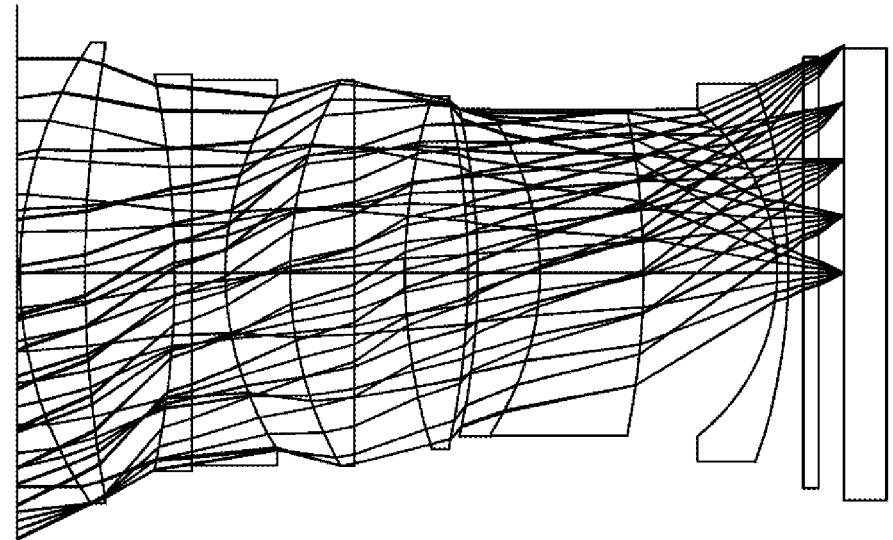
FIG. 3 is a light path schematic diagram of the micro-light night vision lens of the present invention.

Referring to FIGS. 1-3, the present invention provides a micro-light night vision lens, and its specific structure includes the followings:

a inner space of a hollow cylinder body 1 constitutes a micro-light path of the environment, and is used for accommodating several lens units.

A plurality of transition segments are communicated with each other and provided in turn on an inner surface of the cylinder body 1 along its axial extension direction; and the transition segments are used to adapt or limit the position of different sizes of the lens units.

A number of lens units are disposed at different positions of the transition segments in sequence and at intervals along the direction of the central axis of the cylinder body; the optical axis of each lens unit coincides with the central axis of the cylinder body 1.

A CCD unit 2 is provided at one end of the cylinder body 1 in the axial direction, wherein the CCD unit 2 is located on a light-out side of the corresponding lens unit and spaced apart from the cylinder body 1, and the CCD unit 2 having a radial dimension which is not larger than a diameter of the lens unit at the other end of the cylinder body 1 in the axial direction. It can be seen from the drawings that the number of the transition segments which are on the inner surface of the cylinder body of the present invention, is four, an inner diameters of a first transition segment 11, a second transition segment 12, and a third transition segment 13 are decreased in sequence, an inner diameter of a fourth transition segment 14 is larger than an inner diameter of the third transition segment 13, and is smaller than the inner diameter of the second transition segment 12; Correspondingly, an outer diameter of the cylinder body 1 corresponding to the first transition segment 11, the outer diameter of the cylinder body 1 corresponding to the second transition segment 12 and the outer diameter of the cylinder body 1 corresponding to the third transition segment 13 are decreased in turn, the outer diameter of the cylinder body 1 corresponding to the fourth transition segment 14 is larger than the outer diameter of the cylinder body 1 corresponding to the third transition segment 13, and smaller than the outer diameter of the cylinder body 1 corresponding to the second transition segment 12. The cylinder body can be adapted with a larger size CCD unit 2 so as to have a larger effective focal length, i.e., to see further and more clearly, to see the objects up to tens of meters, under the condition that there is such a compact lens and the object distance remains unchanged, and in combination with the enhancement of the number of pixels of the larger size CCD unit 2, to provide an image with more details.

In one embodiment, the number of lens units are selected to be six:

a first lens unit 100 is disposed at an end of the first transition segment 11 away from the second transition segment 12; i.e., the leftmost position of FIG. 1;

a second lens unit 200 is disposed at an end of the first transition segment 11 adjacent to the second transition segment 12;

a third lens unit 300 is disposed at a non-end position of the second transition segment 12;

a fourth lens unit 400 is provided at an end of the second transition segment 12 adjacent to the third transition segment 13;

a fifth lens unit 500 is provided at a non-end position of the third transition segment 13;

a sixth lens unit 600 is provided on an inner surface of the cylinder body 1 at an end of the third transition segment 13 adjacent to the fourth transition segment 14, i.e., the rightmost position inside the cylinder body 1.

To ensure the relative positions of the individual lens units remain constant, annular position limiting members 700 are separately provided between the first lens unit 100 and the second lens unit 200, between the second lens unit 200 and the third lens unit 300, between the third lens unit 300 and the fourth lens unit 400, and between the fifth lens unit 500 and the sixth lens unit 600, and are set against edges of end surfaces of the adjacent lens units each other. The annular position limiting members 700 used in FIG. 1 are indicated by sequential numbering for the purpose of differentiation, such as a first annular position limiting member 701 is provided between the first lens unit 100 and the second lens unit 200; a second annular position limiting member 702 is provided between the second les unit 200 and the third lens unit 300; a third annular position limiting member 703 is provided between the third lens unit 300 and the fourth lens unit 400; and a fourth annular position limiting member 704 is provided between the fifth lens unit 500 and the sixth lens unit 600.

As shown in FIG. 1-2, the first lens unit 100 only includes a lens, i.e., a first meniscus convex lens, a radius of curvature of a convex surface of a light-in side of the first meniscus convex lens is smaller than a radius of curvature of a concave surface of a light-out side of the first meniscus convex lens; and the convex surface of the light-in side of the first meniscus convex lens also extends outwardly beyond an end surface contour of the cylinder body 1; in order to improve the light intake and the field of view rage of the first lens unit 100, the end portion of the first transition segment 11 is provided with a conical or serrated inner surface, and in order to avoid blocking the incident light, the inner surface contour of the first annular position limiting member 701 is similar to the serrated inner surface of the end portion of the first transition segment 11. To illustrate with an example of light rays being injected into the cylinder body 1 from the left side, the focal point of the first lens unit 100 is the right direction of the direction in which the incident light rays enter, and the focal length of the first lens unit 100 is positive, and therefore serves as a convergence of the incident light rays.

As shown in FIG. 1-2, the incident light rays pass through the first lens unit 100, and immediately thereafter enters the second lens unit 200. The second lens unit 200 comprises a first piano-concave lens 201 and a second piano-concave lens 202, a concave surface of the first piano-concave lens 201 is a light-in side of the second lens unit 200, and a concave surface of the second piano-concave lens 202 is a light-out side of the second lens unit 200, the concave surface of the first piano-concave lens 201 has a radius of curvature greater than the radius of curvature of the concave surface of the second piano-concave lens 202, and a flat end surface of the first piano-concave lens and a flat end surface of the second piano-concave lens are set against each other. The concave surface of the first piano-concave lens 201 is directed toward to the direction where the light rays outgo, so the focal length of the first piano-concave lens 201 is negative; the concave surface of the second piano-concave lens 202 is directed toward to the direction where the light rays outgo, so the focal length of the second piano-concave lens 202 is positive; the second lens unit 200 serves as a diverging effect for the incident light rays. In order to further constrain the relative position between the first piano-concave lens 201 and the second piano-concave lens 202, a first stepped portion A is made at the end of the second transition segment 12 near the first transition segment 11, the diameter of the first stepped portion A is larger than the diameter of the second transition segment 12, and at the same time the diameter of the selected first piano-concave lens 201 is larger than the diameter of the second piano-concave lens 202, the edge of the first piano-concave lens 201 is completely fit to the surface of the first stepped portion A, so as to provide a good limiting position function for the first piano-concave lens 201. The first piano-concave lens 201 and the second piano-concave lens 202 may be fixed by means of adhesive bonding between adjacent flat end surfaces of the first piano-concave lens 201 and the second piano-concave lens 202.

Similarly, the third lens unit 300 includes a piano-convex lens, the convex surface of the piano-convex lens is the light-in side of the third lens unit 300, the flat end surface of the piano-convex lens is the light-out side of the third lens unit 300; the diameter of the piano-convex lens is the same as the diameter of the second piano-concave lens 202, a radius of curvature of the convex surface of the piano-convex lens is less than a radius of curvature of the convex surface of the first meniscus convex lens. The focal length of the piano-convex lens is positive and acts as a convergence of the incident light rays. The two ends of the piano-convex lens are spaced apart and fixed relative to the second lens unit 200 and the fourth lens unit 400 by the second annular position limiting member 702 and the third annular position limiting member 703, respectively.

The fourth lens unit 400 includes a biconvex lens, and the radius of the curvature of the convex surface of the light-in side of the biconvex lens is less than the radius of the curvature of the convex surface of the light-out side of the biconvex lens, and the radius of the curvature of the convex surface of the light-in side of the biconvex lens is larger than the radius of the curvature of the convex surface of the light-in side of the first meniscus convex lens. It can be seen from the drawings, the focal length of the light-in side of the biconvex lens is positive, the focal length of the light-out side of the biconvex lens is negative, and the fourth lens unit 400 as a whole plays the role of convergence of the incident light. In order to keep the position of the fourth lens unit 400 unchanged, a second stepped portion B is provided at the end of the third transition segment 13 adjacent to the second transition segment 12, the diameter of the second stepped portion B is larger than the diameter of the third transition segment 13, and smaller than the diameter of the second transition segment 12, and the end of the biconvex lens and the surface of the second stepped portion B are set against each other, due to the common contribution of the third annular position limiting member 703 and the second stepped portion B, the fourth lens unit 400 will be confined to one end of the third transition segment 13 and remain in the current position.

The fifth lens unit 500 comprises a second meniscus convex lens 501 and a first meniscus concave lens 502, wherein a light-in side of the second meniscus convex lens 501 and a light-in side of the first meniscus concave lens 502 are both concave surfaces, a light-out side of the second meniscus convex lens 501 and a light-out side of the first meniscus concave lens 502 are both convex surfaces, and the radius of curvature of the light-out side of the second meniscus convex lens 501 is equal to the radius of curvature of the light-out side of the first meniscus concave lens 502 and they fit each other, the radius of curvature of the concave surface the light-in side of the second meniscus convex lens 501 is less than the radius of curvature of the convex surface of the light-out side of the first meniscus concave lens 502. The second meniscus convex lens 501 play a role of convergence of the incident light, and the first meniscus concave lens 502 play a role of divergence of the incident light. For keeping the distance between the fifth lens unit 500 and the fourth lens unit, a third stepped portion C is provided at non-end position of the third transition segment 13, an inner diameter of the third stepped portion is smaller than the inner diameter of the third transition segment 13, the edge of the first meniscus convex lens 502 is set against to both surfaces of the third transition segment 13 and the third stepped portion C, further, by bonding the convex of the second meniscus convex lens 501 and the first meniscus concave lens 502 to form the adherent integrity, the relative positions of the second meniscus convex lens 501 and the first meniscus concave lens 502 with respect to the fourth lens unit 400 can be limited.

The sixth lens unit 600 comprises a second meniscus concave lens, wherein the light-in side of the second meniscus concave lens is a concave surface on and the light-out side thereof is a convex surface, the radius of curvature of the light-in side being less than the radius of curvature of the light-out side, and a diameter of the sixth lens unit 600 is larger than the diameters of the second lens unit 200, the third lens unit 300, or the fourth lens unit 400, and not larger than the diameter of the first lens unit 100 or the diameter of the second lens unit 200. The second meniscus concave lens is used for divergence of the incident light so that the incident light is projected to a larger area of light sensitive pixels of the CCD unit 2. In order to keep the position of the sixth lens unit 600 unchanged, on one hand, a fourth annular position limiting member 704 is provided against the edge of the adjacent end surfaces of the first meniscus concave lens 502 and the second meniscus concave lens, and on the other hand, a fourth stepped portion D is also provided at the end of the fourth transition segment 14, the fourth stepped portion D convexes toward the central axis of the cylinder body 1 and has a similar diameter to that of the third transition segment 13, and the end of the second meniscus concave lens in the radial direction is correspondingly provided with a cut-out, the surface where the cut-out is located is set against the surface of the fourth stepped portion D and the inner surface of the fourth transition segment 14, respectively.

As one specific embodiment of the present invention, the following table gives the relevant parameters, in millimeters, of the lenses selected for use in each lens unit.

As for each lens selected for the above parameters, the parameters of the corresponding micro-light night vision lens, are as follows: the resolution of the CCD unit 2 is 1280×1080; the effective focal length EFL is 17 mm; the focal number F/NO. is 1.1; the field of view FOV is 40.3° in the vertical direction and 32.7° in the horizontal direction; the optical back focal length BFL is 1.93 mm; the total length of the cylinder body 1 is 26.2 mm, and the total length of the micro-light night vision lens is 29 mm; the aberration is not more than 1%; and the relative illumination is ≥relative %.

In order to provide protection for the CCD unit 2, a planar lens 800 is further provided between the sixth lens unit 600. the planar lens 800 is spaced apart from the sixth lens unit 600 and the CCD unit 2, respectively.

In order to improve the imaging quality, an AR reflection-reducing film may be further coated on the surface of each lens, even though the AR reflection-reducing film is provided on the fitting surface between the first piano-concave lens and the second piano-concave lens that are fitted together, as well as on the fitting surface of the second meniscus convex lens and the first meniscus concave lens as well.

Figure 4:
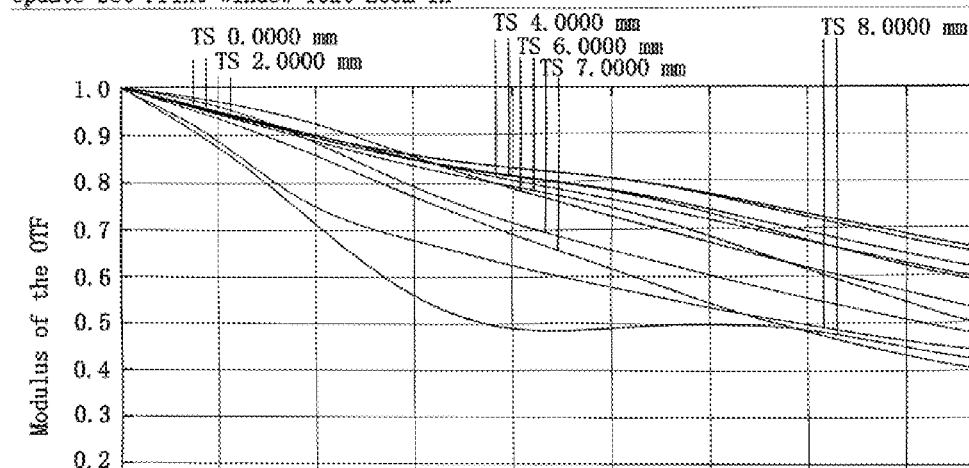
FIG. 4 is a MTF diagram of the micro-light night vision lens of the present invention.

FIG. 4 shows an MTF diagram of an embodiment of the present invention, wherein the MTF image is a resolution condition of the lens imaging, the vertical axis indicates the degree of the contrast, and the horizontal axis indicates the distance from the center to the edge of the lens.

Figure 5:
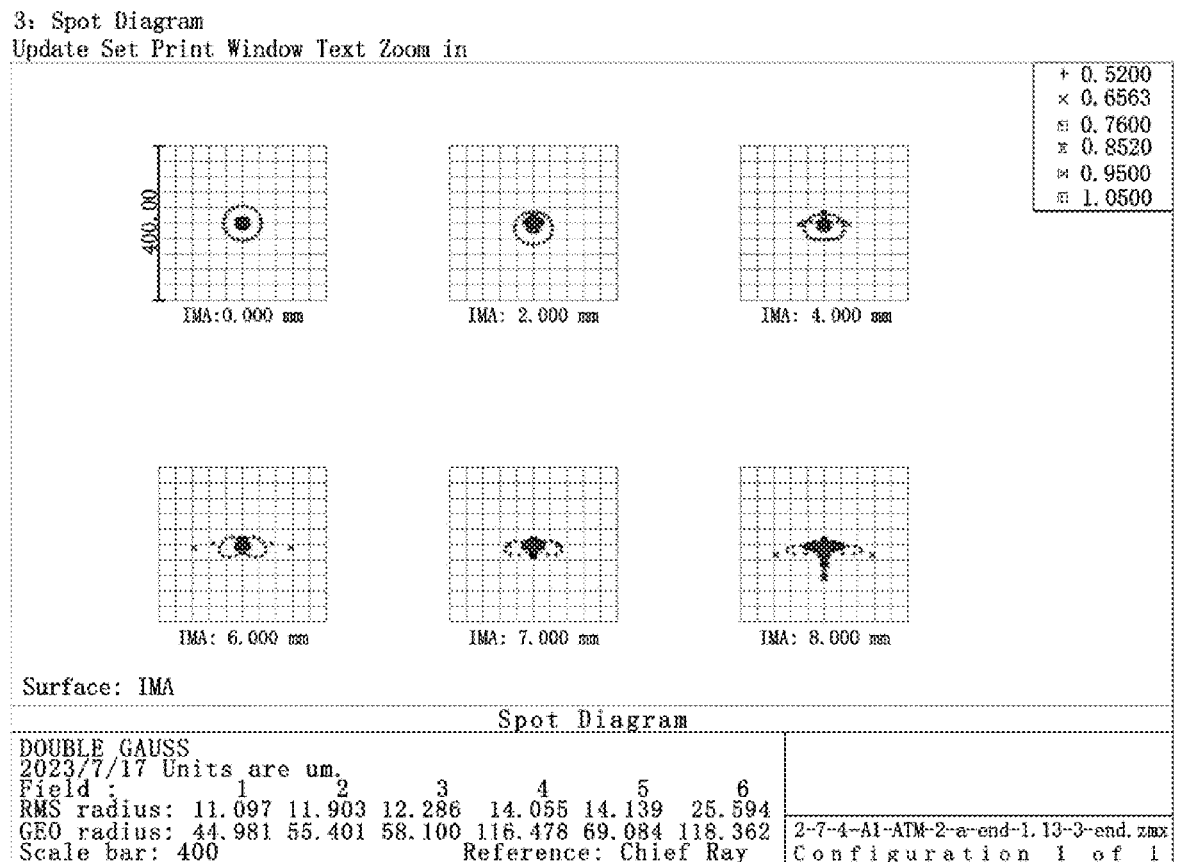
FIG. 5 is a dot plot of the micro-light night vision lens of the present invention.

FIG. 5 is dot plot for an embodiment of the present invention, a number of light rays emitted from a point pass through the lens, due to aberration so that its intersection with the image plane is no longer concentrated in the same point, but a dispersion diagram where points are dispersed in a certain range is formeds, known as dot plot. The dot plot is one of the most commonly used evaluation methods in optical design.

The above description is only a preferred embodiment of the present invention, and is not intended to limit the present invention, under the spirit and principles of the present invention, any modifications, equivalent replacements, improvements, etc., should be included in the scope of protection of the present invention.

What is claimed is:

1. A micro-light night vision lens, characterized in that, the micro-light night vision lens comprises:

a hollow cylinder body (1);

a plurality of transition segments, communicated with each other and provided in turn on an inner surface of the cylinder body (1) along its axial extension direction;

a plurality of lens units, provided in succession and at intervals at different positions on the inner surface of the cylinder body (1) along a central axis direction of the cylinder body (1);

a CCD unit (2), provided at one end of the cylinder body (1) in the axial direction, wherein the CCD unit (2) is located on a light-out side of the corresponding lens unit and spaced apart from the cylinder body (1), and the CCD unit (2) having a radial dimension which is not larger than a diameter of the lens unit at the other end of the cylinder body (1) in the axial direction;

wherein the number of the transition segments is four, inner diameters of a first transition segment (11), a second transition segment (12), and a third transition segment (13) are decreased in sequence, an inner diameter of a fourth transition segment (14) is larger than an inner diameter of the third transition segment (13), and is smaller than the inner diameter of the second transition segment (12), an outer diameter of the cylinder body (1) corresponding to the first transition segment (11), the outer diameter of the cylinder body (1) corresponding to the second transition segment (12) and the outer diameter of the cylinder body (1) corresponding to the third transition segment (13) are decreased in turn, the outer diameter of the cylinder body (1) corresponding to the fourth transition segment (14) is larger than the outer diameter of the cylinder body (1) corresponding to the third transition segment (13), and smaller than the outer diameter of the cylinder body (1) corresponding to the second transition segment (12);

wherein the number of lens units are six, a first lens unit (100) is disposed at an end of the first transition segment (11) away from the second transition segment (12), a second lens unit (200) is disposed at an adjacent end of the first transition segment (11) adjacent to the second transition segment (12), a third lens unit (300) is disposed at a non-end position of the second transition segment (12), a fourth lens unit (400) is provided at an end of the second transition segment (12) adjacent to the third transition segment (13), a fifth lens unit (500) is provided at a non-end position of the third transition segment (13), a sixth lens unit (600) is provided on an internal surface of the cylinder body (1) at an end of the third transition segment (13) adjacent to the fourth transition segment (14), annular position limiting members (700) are separately provided between the first lens unit (100) and the second lens unit (200), between the second lens unit (200) and the third lens unit (300), between the third lens unit (300) and the fourth lens unit (400), and between the fifth lens unit (500) and the sixth lens unit (600), and the annular position limiting members are set against edges of end surfaces of the adjacent lens units facing each other;

wherein the first lens unit (100) comprises a first meniscus convex lens, a radius of curvature of a convex surface of a light-in side of the first meniscus convex lens is smaller than a radius of curvature of a concave surface of a light-out side of the first meniscus convex lens, and the convex surface of the light-in side of the first meniscus convex lens also extends outwardly beyond an end surface contour of the cylinder body (1);

wherein the second lens unit (200) comprises a first plano-concave lens and a second plano-concave lens, a concave surface of the first plano-concave lens is a light-in side of the second lens unit (200) and a concave surface of the second plano-concave lens is a light-out side of the second lens unit (200), the concave surface of the first plano-concave lens has a radius of curvature greater than the radius of curvature of the concave surface of the second plano-concave lens, and a flat end surface of the first plano-concave lens and a flat end surface of the second plano-concave lens are set against each other;

the third lens unit (300) comprises a plano-convex lens, the plano-convex lens having a positive focal length;

the fourth lens unit (400) comprises a biconvex lens, the biconvex lens having a positive focal length on the light-in side and a negative focal length on the light-out side;

the fifth lens unit (500) comprises a second meniscus convex lens and a first meniscus concave lens, wherein a light-in side of the second meniscus convex lens and a light-in side of the first meniscus concave lens are both concave surfaces, a light-out side of the second meniscus convex lens and a light-out side of the first meniscus concave lens are both convex surfaces, and the radius of curvature of the light-out side of the second meniscus convex lens is equal to the radius of curvature of the light-in side of the first meniscus concave lens and they fit each other, and the radius of curvature of the concave surface of the light-in side of the second meniscus convex lens is smaller than the radius of curvature of the convex surface of the light-out side of the first meniscus concave lens;

the sixth lens unit (600) comprises a second meniscus concave lens, wherein the light-in side of the second meniscus concave lens is a concave surface and the light-out side of the second meniscus concave lens is a convex surface, the radius of curvature of the light-in side being less than the radius of curvature of the light-out side, and a diameter of the sixth lens unit (600) is larger than the diameters of the second lens unit (200), the third lens unit (300), or the fourth lens unit (400), and not larger than the diameter of the first lens unit (100) or the diameter of the second lens unit (200).

2. The micro-light night vision lens according to claim 1, characterized in that, the convex surface of the plano-convex lens of the third lens unit (300) is the light-in side of the third lens unit (300), and the flat end surface of the plano-convex lens is the light-out side of the third lens unit (300); the diameter of the plano-convex lens is identical to that of the second plano-concave lens, and a radius of curvature of the convex surface of the plano-convex lens is smaller than the radius of curvature of the convex surface of the first meniscus convex lens.

3. The micro-light night vision lens according to claim 1, characterized in that, the radius of curvature of the convex surface of the light-in side of the biconvex lens of the fourth lens unit (400) is smaller than the radius of curvature of the convex surface of the light-out side of the biconvex lens; and the radius of curvature of the convex surface of the light-in side of the biconvex lens is also larger than the radius of curvature of the convex surface of the light-in side of the first meniscus convex lens.

\* \* \* \* \*